United States Patent Office 3,008,860
Patented Nov. 14, 1961

3,008,860
METHOD OF MAKING REINFORCED ENDLESS RUBBER BELTS FOR USE AS DRAFT APRONS
Mark Balkin and Denys G. Turner, Newcastle upon Tyne, England, assignors to George Angus & Company Limited, Newcastle upon Tyne, England
Filed Oct. 8, 1956, Ser. No. 614,619
Claims priority, application Great Britain Oct. 11, 1955
2 Claims. (Cl. 156—171)

This invention relates to the production of reinforced endless rubber belts or bands and particularly to relatively small flat belts or bands which are used for supporting and conveying fibres in the drafting of textile fibres and are often called draft aprons.

In many kinds of endless rubber belts and bands, it is known to use a reinforcement of cord extending helically around the belt or band and incorporated into the thickness thereof during manufacture. Such a helical reinforcement has long been recognised as a satisfactory means of preventing stretching of a rubber belt or band, without materially reducing flexibility and without introducing internal friction as is liable to occur with a woven fabric reinforcement, and is easily built-up by helically winding cord on to a former for the belt or band. The former may be a cylindrical mandrel on to which the cord is wound directly and then incorporated, by subsequently applied pressure and vulcanization, in a layer of rubber applied over the cord winding. The disadvantage of this is that the cords are not completely surrounded by rubber and remain substantially exposed on the inner surface of the band. Alternatively, to surround the cords completely by rubber, the former, which may then comprise a mandrel or, for long belts, a pair of parallel rollers spaced apart, may carry a layer of rubber over the surface of which the cord is wound and then covered by another layer of rubber, the two layers of rubber with the helical cord winding between them being then bonded together by vulcanization. An endless band of sufficient width, like a tube, to be cut up into narrower bands or belts, may be made by these known methods.

The present invention provides an improved method of incorporating a helical cord reinforcement in an endless rubber band or belt by winding the cord on to a layer of rubber on a cylindrical mandrel and, according to the invention, the rubber is prepared in a sufficiently plastic condition and of a thickness to provide the desired thickness of the finished band or belt as a unitary layer and the cord during winding is maintained under such controlled tension that, by the act of winding, the cord cuts into and becomes embedded completely within the thickness of the rubber layer.

After winding of the cord, the mandrel complete with the rubber and cord layer thereon is wrapped in wet cloth and vulcanized, such as in a steam pan, in the usual way.

It is found that a helically reinforced band produced by this method presents a substantially smooth outer surface, the rubber displaced between successive convolutions of the cord during winding having flowed back over the cord, and, for making draft aprons, a surface suitable for fibre-drafting can be produced on the band by grinding or buffing in the usual way.

The invention will now be described with reference to the accompanying drawings, in which.

Figure 1:
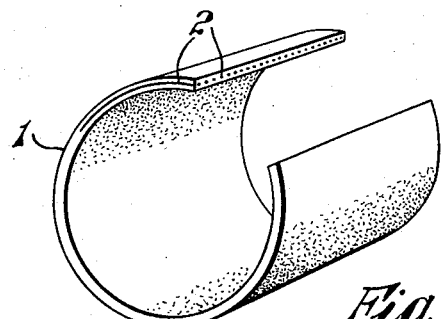
FIG. 1 is a perspective view of a reinforced rubber band with a piece cut out to reveal the internal structure.

A rubber band as shown by FIG. 1, and suitable for use as a draft apron for textile fibres, consists of a single thickness of rubber 1 within which is embedded a continuous length of cord 2, for example of nylon, forming a helical reinforcement, with spaced convolutions, through the middle of the rubber.

To make a number of such bands, a relatively long tube, of the same structure as is shown by FIG. 1, is made and cut transversely into pieces of the desired width, each piece forming a band.

The long tube is made by a machine, as shown by FIGS. 2 to 5 of the drawings, and comprising a cylindrical rod mandrel 3 one end of which is held by a driving chuck 4, by which the mandrel can be rotated at a constant speed by a motor and suitable reduction gear in a casing 5. On the mandrel 3 is placed, as a sleeve, an extruded tube of rubber 1 in a plastic and tacky condition which is more fully described later.

Apparatus for feeding a cord 2 to be wound under tension into the rubber 1 on the mandrel 3 is mounted on slideways 6 and 7 on the bed of the machine and is traversed along the mandrel by a lead screw 8.

The cord 2 is led from a spool 9, which either moves with the apparatus or is far enough away to allow the cord to splay from the spool, and first passes through the eye of a bent wire guide 10. The cord 2 then passes through the eye at the outer end of a radial arm 11 of a spring-loaded constant torque device 12 and then in turn between two pairs, 13 and 14, of spring-loaded friction discs of the kind known in controlled tensioning apparatus for thread.

The pressure between the first pair of discs 13 is controlled automatically by a spur lever 15 (see FIG. 4) on the constant torque device 12 varying the compression of a spring 16 so that the frictional restraint of the discs 13 on the cord 2 is increased or reduced as the pull of the cord on the arm 11 reduces or increases respectively. The pressure between the second pair of discs 14 is manually adjusted by a graduated scroll cam 17 varying the compression of a spring 18 to place the cord under a selected degree of tension.

Figure 2:
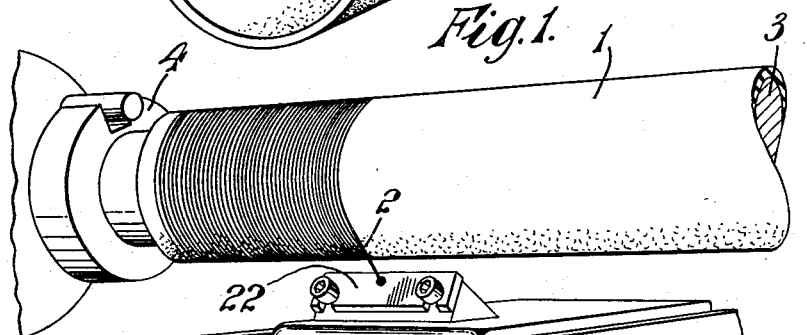
FIG. 2 is a fragmentary perspective view of part of apparatus for carrying out the invention.
Figure 5:
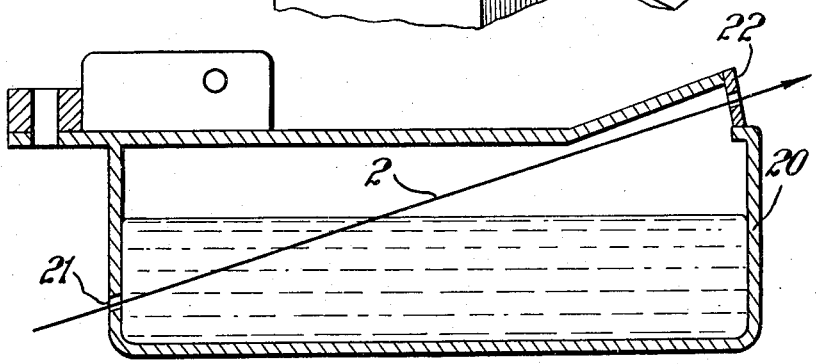
FIG. 5 is a longitudinal section through a bath for applying rubber solution to the cord.

From the discs 14, the cord 2 passes round a bent wire guide 19 and then through a bath 20 (see FIG. 5), containing rubber solution, to meet tangentially and be wound into the rubber 1 on the mandrel 3 (see FIG. 2). It will be observed that the hole 21 by which the cord enters the bath 20 is below the level of the solution therein but the solution is of high viscosity and no significant leakage through the hole 21 occurs. This simple arrangement enables the cord to be passed under tension through the bath of solution and to emerge through an orifice plate 22, the orifice size of which is selected to effect wiping of superfluous solution from the cord.

Figure 3:
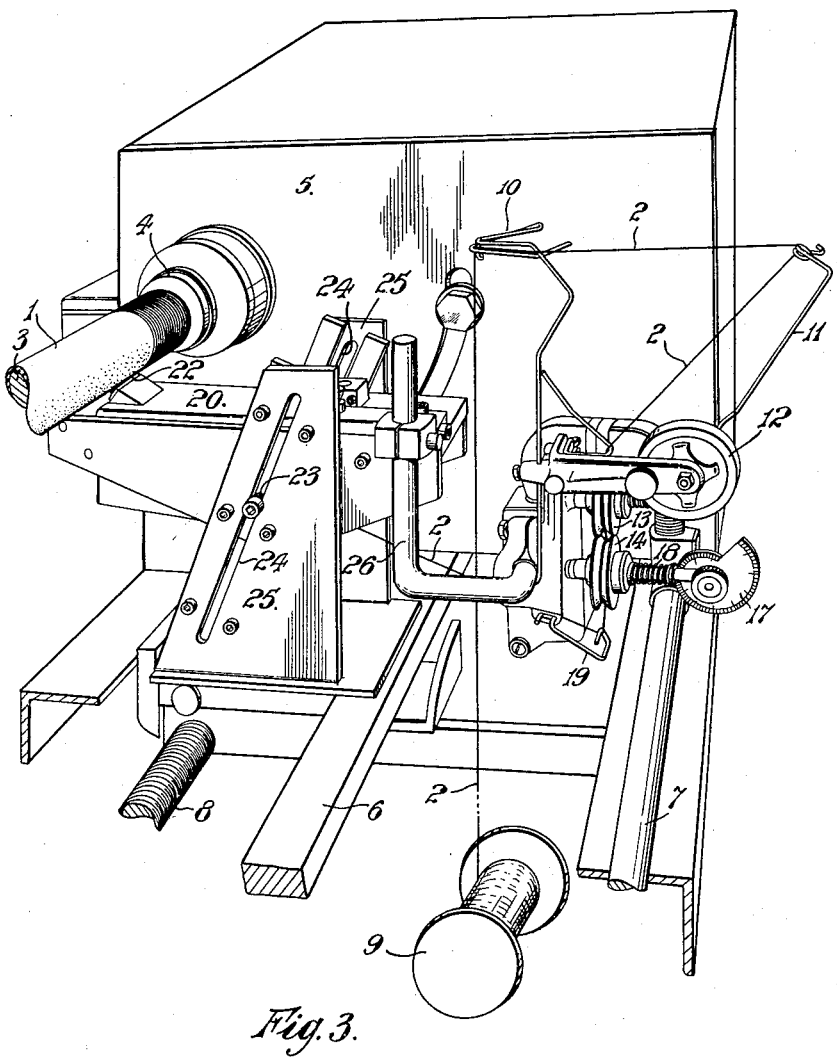
FIG. 3 is a perspective view of a machine for carrying out the invention, some parts being broken away to facilitate illustration.
Figure 4:
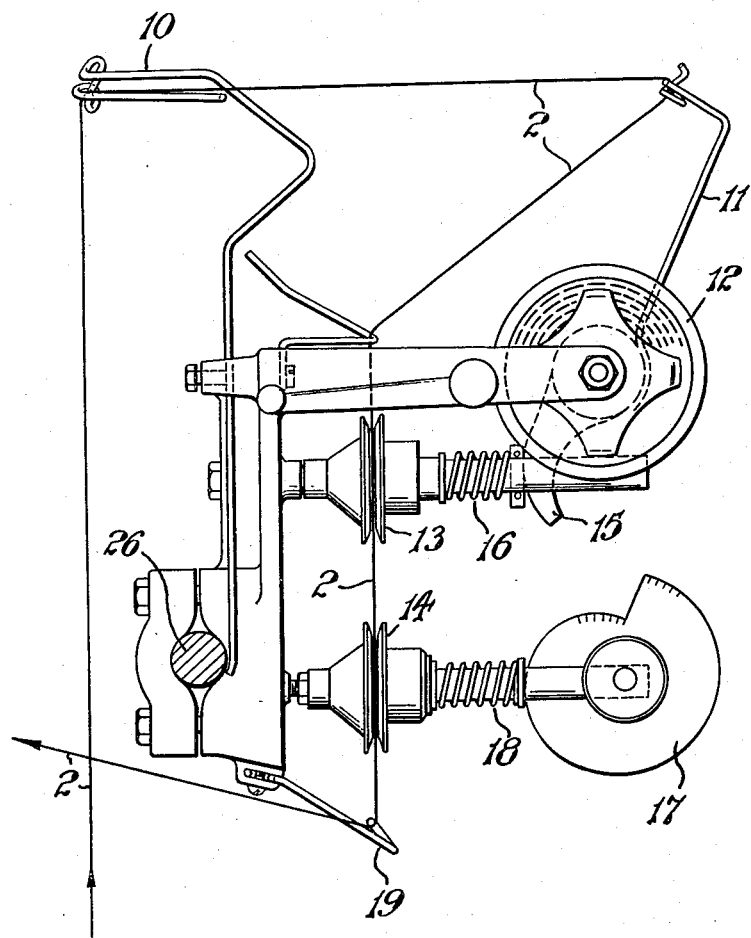
FIG. 4 is a somewhat schematic detail view of cord-tensioning apparatus.

It can be seen from FIG. 3 that the bath 20 is adjustably mounted, by studs 23 in inclined slots 24 in a pair of brackets 25, so that the emergence of the cord 2 can be adjusted to suit different sizes of mandrels. Also, the bath 20 and the cord tensioning apparatus are adjustably interconnected by the arm 26 for mutual support and setting in their relative positions.

When the apparatus is first threaded up, the end of the cord is wrapped around the end of the rubber tube on the mandrel with an overlap winding to anchor the cord and this end of the tube is eventually cut away as waste.

After the cord has been anchored, rotation of the mandrel and simultaneous traversing of the cord-feeding apparatus is effected to wind the cord helically with the desired spacing of the convolutions and under a tension which is controlled to cause the cord to cut into and become embedded in the rubber to the desired depth.

Many variations are possible of the rubber mix to make it suitably plastic for the cord to become embedded under tension and no rule can be given for the plasticity of the rubber or for the tension under which the cord is wound. These conditions will depend upon the dimensions and intended use of the bands or belts to be produced. In general however, the rubber mix will be appreciably more plastic than it has been customary to use and the layer will be thicker than for a layer of rubber over the surface only of which a cord is wound. Also the tension of the cord will be higher than has been customary in the previously used methods.

It is preferable, but not absolutely essential, for the cord, in passing to the mandrel for winding into the rubber, to be coated or impregnated with rubber adhesive.

The term rubber used in this specification includes natural and synthetic rubbers or similar elastomers and, particularly in the case of bands made for use as draft aprons, an oil-resistant synthetic rubber of the butadiene-acrylic nitrile copolymer type.

By the term cord is meant any suitable twisted or non-twisted cord, twine or thread and especially, for bands for use as draft aprons, a fine thread of nylon or similar material such as a polyglycol terephthalate fibre known by the registered trade mark "Terylene" and hereinafter referred to as Terylene.

A representative example of the production of a reinforced rubber tube by the method of the present invention, for subsequent cutting up into endless bands for use as draft aprons, is as follows:

Firstly an oil-resistant synthetic rubber composition of an extremely plastic and tacky nature is prepared in the usual way, for instance on a two-roll mixing mill. This composition should have a Mooney plasticity value of about 20 when tested at 120° C. using the large (1½") rotor. A suitable composition is:

| | Parts by weight |
|---|---|
| Butadiene-acrylic nitrile copolymer | 100 |
| Sulphur | 3 |
| Zinc oxide | 5 |
| Stearic acid | 0.5 |
| Reinforcing filler | 50 |
| Plasticizer | 35 |
| Accelerator | 1.5 |

The reinforcing filler may be a suitable carbon black or a white ingredient. The plasticizer may be any suitable plasticizer such as tricresyl phosphate or dibutyl phthalate. The accelerator may be varied to suit the required speed of vulcanization.

The above composition is extruded in tubular form, to the required internal diameter of the bands and with a wall thickness of 0.070 inch approximately, and is dusted with French chalk to facilitate handling and storage. A suitable length is placed as a sleeve on a metal mandrel 3 of the required diameter and all the chalk is removed from the outside surface by wiping with a cloth moistened with a suitable solvent such as trichlorethylene. A helical winding of cord 2 is then applied in the above-described manner with a pitch of 25 turns per inch. A suitable cord comprises two-ply twisted high tenacity Terylene yarn, each ply being of 125 denier and containing 72 individual continuous filaments. The cord is wound with a tension of approximately 250 grams. After winding, the assembly comprising the mandrel, rubber and cord is wrapped tightly in wet cotton fabric and vulcanized for 20 minutes in steam at 60 p.s.i. After removing the cotton wrapping, the tube is finally ground to 0.055 inch wall thickness and cut transversely to form bands or aprons of the required width.

The method provided by the present invention, as compared with known methods, carries the important practical advantages that there are fewer manufacturing steps, the extruded tube or other layer of rubber in which the cord is embedded is substantially thicker than the individual layers of rubber used in a laminated structure, and is consequently easier to produce and handle, and there is no liability of air being trapped between successively applied layers of rubber and causing blisters in the finished product.

We claim:

1. A method of producing a reinforced draft apron comprising mounting a vulcanizable rubber tube on a cylindrical mandrel, said tube being in plastic and tacky condition and having a wall thickness corresponding to the required thickness of the apron, as the tube remains in said condition on the mandrel winding a fine thread over and helically about the tube while so controlling the tension on the thread as to draw it into the tube wall to such a depth that rubber flowing back along the surface of the wall leaves the thread fully embedded in the wall, wrapping the threaded tube tightly in fabric, and subjecting it to vulcanization.

2. A method according to claim 1 wherein the thread is coated with vulcanizable rubber before being wound about the tube and embedded therein.

References Cited in the file of this patent

UNITED STATES PATENTS

| 1,412,309 | Lambert | Apr. 11, 1922 |
| 1,981,644 | Carter et al | Nov. 20, 1934 |
| 2,197,569 | Kimmich | Apr. 16, 1940 |
| 2,239,635 | Walton, Jr. | Apr. 22, 1941 |
| 2,272,883 | Haggan | Feb. 10, 1942 |
| 2,513,106 | Pendergast | June 27, 1950 |
| 2,526,324 | Bloomfield | Oct. 17, 1950 |
| 2,570,895 | Wilson | Oct. 9, 1951 |
| 2,810,424 | Swartswelter et al | Oct. 22, 1957 |

FOREIGN PATENTS

| 678,501 | Great Britain | Sept. 3, 1952 |